United States Patent Office 2,985,634
Patented May 23, 1961

---

2,985,634

PRODUCTION OF POLYMERS AND COPOLYMERS OF ACRYLONITRILE

Wilhelm G. Schmidt, Walsgrave, Coventry, and John E. Field, Stoke, Coventry, England, assignors to Courtaulds Limited, London, England, a British company No Drawing. Filed Aug. 30, 1957, Ser. No. 681,174
Claims priority, application Great Britain Oct. 1, 1956

2 Claims. (Cl. 260—85.5)

This invention relates to the production of polymers of acrylonitrile and copolymers containing a major proportion of acrylonitrile and a minor proportion of one or more other polymerisable compounds such as styrene, methyl acrylate, vinyl acetate and a vinyl pyridine.

It is known to use peroxy compounds such as peroxides and persulphates as catalysts in the production of polyacrylonitrile, and it is also known to use such compounds in conjunction with a reducing agent in the so-called "redox" catalyst systems. More recently it has been proposed, in Hunt's United States Patent No. 2,471,959, to use specific azo compounds, for example azo-bis-isobutyronitrile, as polymerisation catalysts.

The object of this invention is a further class of polymerisation catalyst for making polyacrylonitrile.

In accordance with this invention acrylonitrile is polymerised alone or in conjunction with one or more other polymerisable compounds in the presence of, as catalyst, a 1-tetrazene compound having the general formula $$R'-N=N-N-NH-R'''$$

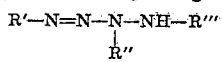

in which R' and R''' are monovalent radicals having a carbon atom attached directly to the N atom in both cases and R'' is hydrogen or a monovalent radical having a carbon atom attached directly to the N atom.

Examples of suitable 1-tetrazene compounds for use in this invention are:

(A) 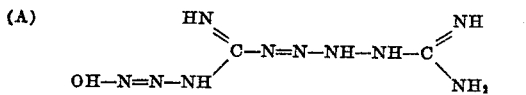
1-nitrosoaminoguanyl-4-guanyl-1-tetrazene (B) 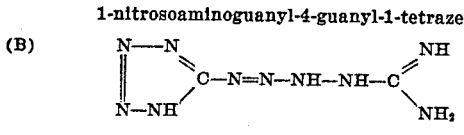
1-tetrazoyl-4-guanyl-1-tetrazene (C) 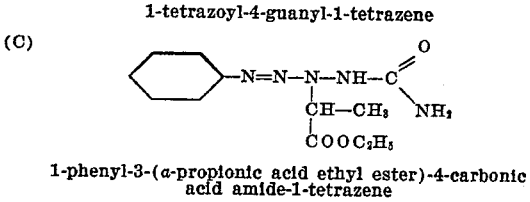
1-phenyl-3-(α-propionic acid ethyl ester)-4-carbonic acid amide-1-tetrazene (L) 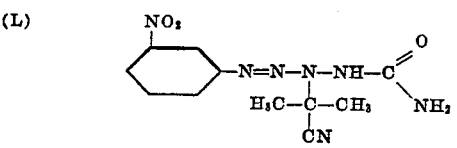
1-m-nitrophenyl-3-isobutyronitrile-4-carbonic acid amide-1-tetrazene 1-tetrazenes which are suitable for use in this invention may be made by coupling semi-carbazides having the general formula NH$_2$·CO·NH·NHR'' (R'' being as defined above) with a diazotised amine having the general formula

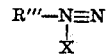

where R''' is as defined above and X is a salt ion such as Cl or HSO$_4$, as follows:

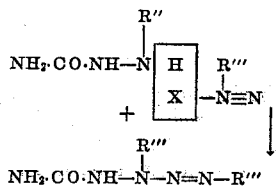

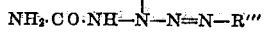

Substituted semicarbazides may be made in known manner from semi-carbazide.

The catalysts according to this invention are stable at ordinary temperatures and readily soluble in monomers and organic solvents; they may be used in the normal catalytic quantities to initiate polymerisation of acrylonitrile, alone or in conjunction with other polymerisable compounds, in aqeuous solution or aqueous suspension whereupon the polymer is prepared as a fine powder. They may also be used in the solvent polymerisation process described and claimed in the specification of the Schmidt application Serial No. 608,706, filed September 10, 1956, according to which the catalytic polymerisation or copolymerisation of acrylonitrile is effected in a concentrated solution of a thiocyanate such as sodium thiocyanate.

The invention is illustrated by the following examples in which percentages are by weight:

EXAMPLE 1

1-nitrosoaminoguanyl-4-guanyl-1-tetrazene was prepared by diazotising aminoguanidine nitrate as described in Berichte, vol. 43 (1910), page 682.

0.3 mol percent of this compound was added to a 12 percent solution of acrylonitrile containing 3 percent of methyl acrylate based on the weight of the acrylonitrile, in a 50 percent aqueous solution of sodium thiocyanate at 60° C. Polymerisation set in at once and was practically complete after 1 hour at 60° C.

The solution, which was light brown in colour, was extruded through a jet into a coagulating bath consisting of a solution of 15 parts of sodium thiocyanate dissolved in 85 parts of water.

The polymer may be bleached to some extent by treating the solution with sulphur dioxide before the extrusion.

EXAMPLE 2

1-tetrazoyl-4-guanyl-1-tetrazene was prepared from 5-amino-tetrazole as described in Berichte, vol. 43 (1910), page 1087. The product was obtained in the form of pale yellow crystals which, while only slightly soluble in water, was sufficiently soluble to be used as catalyst in place of the 1-nitrosoamino guanyl-4-guanyl-1-tetrazene used in Example 1.

This catalyst is also suitable for use in polymerising acrylonitrile or acrylonitrile with methyl acrylate in aqueous emulsion.

EXAMPLE 3

*Preparation of catalyst (1-phenyl-3-(α-propionic acid ethyl ester)-4-carbonic acid amide-1-tetrazene)*

(a) 1 mol (91 ml.) of aniline was dissolved with stirring in 3 mols of 2.5 M hydrochloric acid and the volume made up to 10 litres with water and the aniline was diazotised at 0–5° C. in known manner with 1 mol of NaNO$_2$ used as a 2.5 M solution. The solution was neutralised to Congo Red by adding solid hydrated sodium acetate;

(b) 25 ml. of the diazonium salt prepared as in (a) was added dropwise to a stirred solution of 0.35 gram of α-semicarbazino propionic acid ethyl ester in 30 ml. of water at 0° C. A precipitate started to form after a time and 30 minutes after the addition was completed the pale yellow precipitate was filtered off, washed with distilled water and dried. It was recrystallised from ethanol; it decomposed at 120° C.

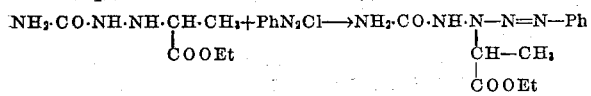

The α-semicarbazino propionic acid ethyl ester may be prepared by (a) reacting acetaldehyde with semicarbazide to form acetaldehyde semi-carbazone which is then reacted with HCN to form α-semicarbazino propionitrile, this product being hydrolysed and esterified with ethanol; (b) refluxing α-bromopropionic acid ethyl ester with semicarbazide hydrochloride and sodium acetate in aqueous ethanol solution, or (c) reducing pyruvic acid semicarbazone with sodium amalgam and then esterifying the product with ethanol.

*Polymerisation*

.2 mol percent of the initiator was dissolved in acrylonitrile and the solution was then added dropwise to water at 60° C. containing an emulsifying agent, the emulsion being rapidly stirred. When 5 percent of the acrylonitrile had been added the mixture was stirred at 60° C. and polymerisation was complete after 1 hour.

EXAMPLE 4

*Preparation of catalyst (1-m-nitrophenyl-3-isobutyronitrile-4-carbonic acid amide-1-tetrazene)*

A solution of 12.8 grams of isobutyronitrile semicarbazide in 380 ml. of water at 0° C. was added to a solution at 0° C. of the diazonium salt prepared from 80 grams of m-nitroaniline in the manner described above for aniline in Example 3. The mixture was stirred for 20 minutes and the product which separated was filtered off, washed and dried. It was a yellow solid, melting point 128.5° C.; it was not soluble in ethanol but was readily soluble in acrylonitrile.

The isobutyronitrile semicarbazide may be prepared readily by mixing equimolecular proportions of semicarbazide hydrochloride, acetone and potassium cyanide and allowing the mixture to stand for 48 hours.

*Polymerisation*

The initiator may be used as a replacement for the 1-nitrosoamino guanyl-4-guanyl-1-tetrazene in the solvent polymerisation described in Example 1 or as a replacement for the 1-phenyl-3-(α-propionic acid ethyl ester)-4-carbonic acid amide-1-tetrazene in the emulsion polymerisation described in Example 3.

What we claim is:

1. A process for the production of acrylonitrile copolymers which comprises forming a polymerizable mixture containing a major proportion of acrylonitrile and a minor proportion of at least one other ethylenically unsaturated compound copolymerizable with acrylonitrile and heating said mixture to effect polymerization thereof in the presence of a catalytic amount of a 1-tetrazene compound chosen from the group consisting of 1-nitrosoaminoguanyl-4-guanyl-1-tetrazene, 1-tetrazoyl-4-guanyl-1-tetrazene, 1-phenyl-3-(α-propionic acid ethyl ester)-4-carbonic acid amide-1-tetrazene, and 1-m-nitrophenyl-3-isobutyronitrile-4-carbonic acid amide-1-tetrazene.

2. A process as claimed in claim 1 wherein the polymerization is effected in solution in a concentrated aqueous solution of sodium thiocyanate.

References Cited in the file of this patent

UNITED STATES PATENTS

| | | |
|---|---|---|
| 2,140,921 | Rein | Dec. 20, 1938 |
| 2,261,195 | Von Herz et al. | Nov. 4, 1941 |
| 2,356,767 | Kropa | Aug. 29, 1944 |
| 2,471,959 | Hunt | May 31, 1949 |
| 2,564,632 | Wicklatz | Aug. 14, 1951 |
| 2,643,990 | Ham | June 30, 1953 |